US006654023B1

(12) United States Patent
Peterson

(10) Patent No.: US 6,654,023 B1
(45) Date of Patent: Nov. 25, 2003

(54) METHOD AND APPARATUS FOR CONTROLLING MIP MAP TRANSITIONS IN A VIDEO GRAPHICS SYSTEM

(75) Inventor: Glen Karl Peterson, North Andover, MA (US)

(73) Assignee: ATI International, SRL, Barbados (KN)

( * ) Notice: Subject to any disclaimer, the term of this patent is extended or adjusted under 35 U.S.C. 154(b) by 0 days.

(21) Appl. No.: 09/324,210

(22) Filed: Jun. 2, 1999

(51) Int. Cl.[7] ............................................. G06T 11/40

(52) U.S. Cl. ........................................ 345/587; 345/582

(58) Field of Search ................................ 345/582, 587, 345/419

(56) References Cited

U.S. PATENT DOCUMENTS 6,292,191 B1 * 9/2001 Vaswani et al. ............ 345/587
6,300,953 B1 * 10/2001 Rivard et al. .............. 345/582

* cited by examiner

Primary Examiner—Matthew Luu
(74) Attorney, Agent, or Firm—Vedder, Price, Kaufman & Kammholz, P.C.

(57) ABSTRACT

A method and apparatus for utilizing mip maps in a video graphics system begins by setting a dynamically configurable level of detail bias that is used to select between potential mip maps. The level of detail bias is set based on the screen resolution. The selection of the mip map, or mip maps, utilized for texturing operations with respect to a particular pixel is performed based on the configurable level of detail bias and the texel-per-pixel ratio between the potential mip maps and the particular pixel to be textured. The dynamic configuration of the level of detail bias allows texture detail to be maintained across multiple display resolutions.

22 Claims, 4 Drawing Sheets

METHOD AND APPARATUS FOR CONTROLLING MIP MAP TRANSITIONS IN A VIDEO GRAPHICS SYSTEM

FIELD OF THE INVENTION

The invention relates generally to video graphics processing and more particularly to a method and apparatus for controlling mip map transitions in a three-dimensional video graphics system.

BACKGROUND OF THE INVENTION

Computers are used in many applications. As computing systems continue to evolve, the graphical display requirements of the systems become more demanding. This is especially true in applications where detailed three-dimensional graphical displays must be updated quickly. One example of such an application is a computer game where movement and modification of background images may place great demands on the processing power of the computing system.

In order to display some screen images, detailed textures are stored in memory. These textures are then filtered and adapted to overlay or map to structures, or graphics primitives, for display. An example is a brick pattern that would be mapped onto a wall structure, and if the wall is extending into the distance, the texture will be mapped in such a way as to show perspective.

In order to facilitate the use of textures, mip maps, or multiple, scaled versions of a texture are often generated for use in texturing operations. Typically, a number of mip maps corresponding to a single texture image are often used, where successive mip maps include less detail. Thus, as a primitive or other shape on the screen fades into the distance, the mip map used to perform the texturing operations with respect to that shape can be a less detailed version of the image represented in the group of mip maps.

Higher display resolutions include more pixels-per-area than lower display resolutions. In higher display resolutions, the level of detail that can be represented for a particular image is increased as more pixels are available to render the image. As such, more detailed mip maps are often employed for texturing operations on higher resolution displays. The trade-off for use of the higher detailed mip maps is in the additional processing power required to utilize these mip maps to texture various objects on the display.

In order to reduce the processing requirements for texturing operations, some prior art systems have eliminated the most detailed mip map created for a particular texturing image. As such, less detailed mip maps are used to perform the texturing operations for the application, and the overall speed of execution of the application is increased. One drawback to this approach is that the most detailed mip map is forfeited entirely, and from no perspective can a user view the full detail of the image represented by the mip maps.

In other prior art solutions that attempt to reduce the amount of processing bandwidth required to utilize a set of mip maps, a fixed level of detail bias setting is used to select between the various mip maps based on the texel-to-pixel ratio for each mip map. The texel-per-pixel ratio indicates the number of texels within a mip map that will map to a particular pixel within the primitive being textured. The level of detail bias is used to select between the available mip maps based on the texel-per-pixel ratio. A higher level of detail bias will cause a more detailed mip map to be used more often, whereas a lower level of detail bias will cause smaller, less detailed mip maps to be used more often. As stated earlier, the use of the larger more detailed mip maps increases texture detail, but decreases overall performance of the application as the processing requirements for the texturing operations escalate. As such, the level of detail bias is often fixed in prior art systems such that less detailed mip maps are selected more often for texturing operations, thus increasing performance at the cost of texture detail.

The static level of detail bias employed in prior art systems often results in the most detailed mip map for particular texture image never being utilized. In the prior art solutions that eliminate the more detailed mip maps, performance is maintained at higher resolutions, but at lower resolutions the detail of the textures is often compromised unnecessarily.

Therefore, a need exists for a method and apparatus for controlling the selection, and transition between, mip maps in a video graphics system that maintains system performance without unnecessarily compromising mip map image detail.

DETAILED DESCRIPTION OF A PREFERRED EMBODIMENT OF THE INVENTION

Generally, the present invention provides a method and apparatus for utilizing mip maps in a video graphics system that maximizes control over the trade-off between the level of detail of the mip maps utilized and the overall performance of the video graphics processing. This is accomplished by setting a dynamically configurable level of detail bias such that the trade-off between performance and detail meets the needs of the particular user or application. Preferably, the level of detail bias is set based on the screen resolution. Such a technique allows for the full detail of a textured mip map to be utilized when appropriate, while maintaining system performance by lowering the level of detail in areas less perceptible to the viewer. The selection of the mip map utilized for texturing operations with respect to a particular pixel is performed based on the configurable level of detail bias and the texel-per-pixel ratio between the mip maps and the particular pixel to be textured.

Figure 1:
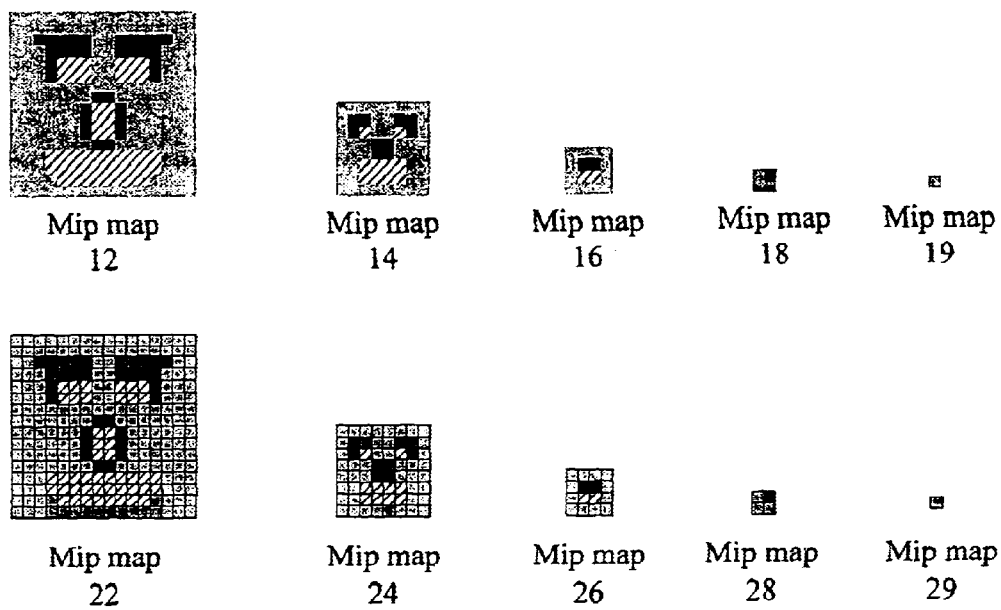
FIG. 1 illustrates a plurality of mip maps that may be used to represent a particular textured image in accordance with the present invention.

The invention can be better understood with reference to FIGS. 1–6. FIG. 1 illustrates a plurality of mip maps 12–19 that may be used for texturing operations involving a particular image. The mip map 12 has the most amount of detail for the particular texture, whereas the mip map 19, which includes a single texel, has the smallest amount of detail. The illustrations of the mip maps 22–29 are the same as the mip maps 12–19, however the mip maps 22–29 include a grid illustrating the separation between various texels within each of the mip maps.

As can be seen, the mip map 22 is a 16-by-16 mip map that includes 16 rows of 16 texels. The mip map 24 is one quarter of the size of the mip map 22, as both the horizontal and vertical dimensions are reduced by one half. Thus, the mip map 24 is an 8 texel by 8 texel mip map. The resolution of detail continues to degrade as the mip map 26 is a 4 by 4 mip map, the mip map 28 is a 2 by 2 mip map, and the mip map 29 is a single texel. It should be apparent to a viewer that the level of detail is severely degraded in the smallest mip map 29, and very noticeably degraded in the mip maps 26 and 28.

When a texturing operation is to be performed for particular pixel within a display, the appropriate mip map to use for determination of the color of the pixel is an important consideration. It should be noted that while the discussion centers around generating pixel colors for a display, the term display is meant to include various pixel grid structures. Such grid structures can include actual displays such as cathode ray tube (CRT) displays and liquid crystal displays (LCDs), textures stored in memory, an image file stored in memory, etc. The translation of the coordinates of the particular pixel with respect to the XY space of the display to the UV space of the texture map determines the particular texel or texels to be used in generation of the color for particular pixel. In most cases, the level of detail of the particular mip map chosen for a texturing operation corresponds to the texel-per-pixel ratio at the particular point within the graphics primitive that is being textured.

Figure 2:
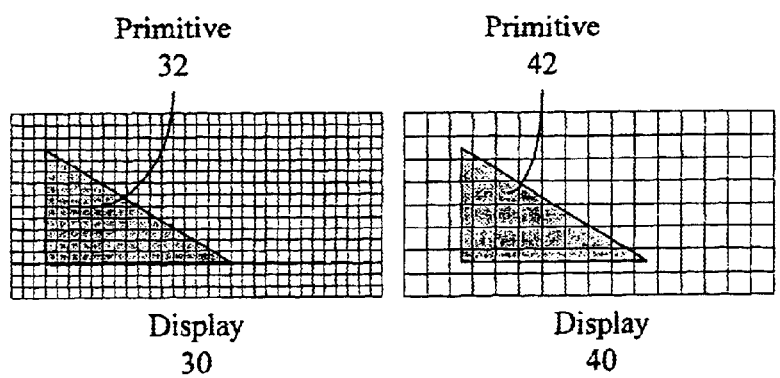
FIG. 2 illustrates video graphics primitives rendered on displays on differing resolutions in accordance with the present invention.

FIG. 2 illustrates a graphics primitive 32 drawn to a display 30 that is assumed to have a high resolution. The resolution of the display 30 is four times that of the resolution of the display 40 upon which the primitive 42 is to be drawn. The grids of the displays 30 and 40 represent a pixel grid within the display, and it can be seen that the display 30 has four times the number of pixels/area as the display 40. As such, the display 30 is capable of supporting much more detailed images. The display 40 has fewer pixels with which to draw images, thus resulting in less potential detail. As such, less detailed mip maps are often chosen to texture primitives, such as the primitive 42, in less detailed displays. Similarly, more detailed mip maps are often utilized in higher resolution displays such as the display 30.

It should be noted that the size of the primitives 32 and 42 will be the same on the screen as perceived by the viewer, however additional detail may be present in the primitive 32 in terms of texture mapping, edge transition, and other visual details that can be affected by screen resolution. The additional resolution of the screen provides additional pixels that allow for better rendering of texture details. However, as stated earlier, when more detailed mip maps are utilized to perform the texturing operations within a primitive, additional processing power must be utilized to perform the texturing operations. This need for processing power is compounded by the need to texture the greater number of pixels present in the higher display.

The width of the primitive 32 as shown on the display 30 is 16 pixels. Note that this assumes that each square in the display 30 represents a single pixel. It should be apparent to one of ordinary skill in the art that the squares within the grids illustrated may represent multiple pixels, just as the squares within the grids used in the mip maps 22–28 may represent multiple texels. In order to determine the appropriate mip map to utilize for texturing the primitive 32, a determination is made as to which mip map has the most appropriate texel-per-pixel ratio for the texturing operation. Because the width of the primitive 32 is 16 pixels, and the width of the mip map 22 is 16 texels, the mip map 22 may be selected as the appropriate mip map to be used to perform the texturing operations on the primitive 32.

The primitive 42 drawn to the display 40 is shown to have a width of approximately 8 pixels, which would result in a 4-to-1 texel-per-pixel ratio between the mip map 22 and each of the pixels within the primitive 42. The texel-per-pixel ratio of 4-to-1 indicates that 4 texels within the mip map 22 could be used to generate the texture color for each of the pixels in the primitive 42. Rather than perform the processing required to compute the appropriate color based on 4 texels, the mip map 24 may be employed instead. The mip map 24 is an 8-by-8 mip map, thus indicating that the texel-per-pixel ratio between the mip map 24 and a pixel within the primitive 42 would be a 1-to-1 texel-per-pixel ratio. Thus, the less detailed mip map 24 would most likely be more appropriate for texturing the primitive 42 in the less detailed display 40. Note that the processing required to perform this texturing operation will be significantly less than that required to perform the texturing of the primitive 32 utilizing the mip map 22.

In selecting which of the mip maps to utilize for texturing operations for particular pixel within a primitive, a level of detail bias value may be consulted as well as the texel-per-pixel ratios of the various mip maps. Thus, the level of detail bias indicates whether or not there is preferential selection of more detailed mip maps in a particular display over less detailed mip maps. Similarly, the level of detail bias can bias the system towards the selection of less detailed mip maps such that the performance of the system is increased at the expense of texture detail. At lower resolutions, the level of detail bias has less of an effect on performance, as the majority of the primitives on the display will include pixels that will utilize less detailed mip maps, resulting in faster video graphics processing in the form of higher frame rates. However, in higher detail displays, the selection of the mip map for texturing operations can have a much greater effect on the overall system performance in terms of frame rate. By configuring the level of detail bias based on the screen resolution, detail can be maintained when appropriate and sacrificed when it is least perceptible by a user such that overall processing speed can be maintained.

Thus, if the level of detail bias for a high resolution display is configured such that the most detailed mip maps are only selected in the ideal situations where all of the detail present in the most detailed mip map will be apparent to a viewer, and less detailed mip maps are used in other situations, the trade-off between performance and textured detail can be set at an optimal level. One example setting may configure the level of detail bias based on the screen resolution such that the transitions between the mip maps on the display are consistent from one resolution to the next. Thus, the point on the display where the transition between the mip map 26 and the mip map 28 occurs in a low resolution would coincide with the same point at a higher resolution. Due to the increased number of pixels available to render an image in the higher resolution display, additional transitions may be present that coincide with the usage of more detailed textures that would not be usable or appropriate at lower resolutions due to unfavorable texel-to-pixel ratios.

The solution provided herein for controlling mip map transitions avoids the limitations of prior art solutions that eliminated higher resolution mip maps entirely. Although these prior art solutions provided adequate levels of performance, they sacrificed the full detail present in the highest resolution mip map. Thus, no matter what the perspective of the user with respect to various objects in a three-dimensional display, the full detail of a particular texture image mapped to the objects would never be perceived. By configuring the level of detail bias based on the screen resolution, the maximum level of texture detail is maintained while still providing a boost in performance in comparison to prior art solutions that did not adapt the level of detail bias based on screen resolution.

Figure 3:
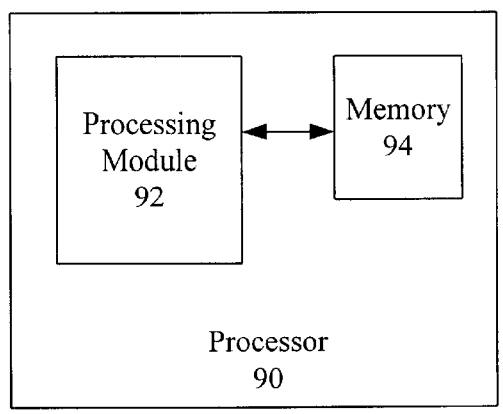
FIG. 3 illustrates a processor for managing mip map transitions in a video graphics system in accordance with the present invention.
Figure 4:
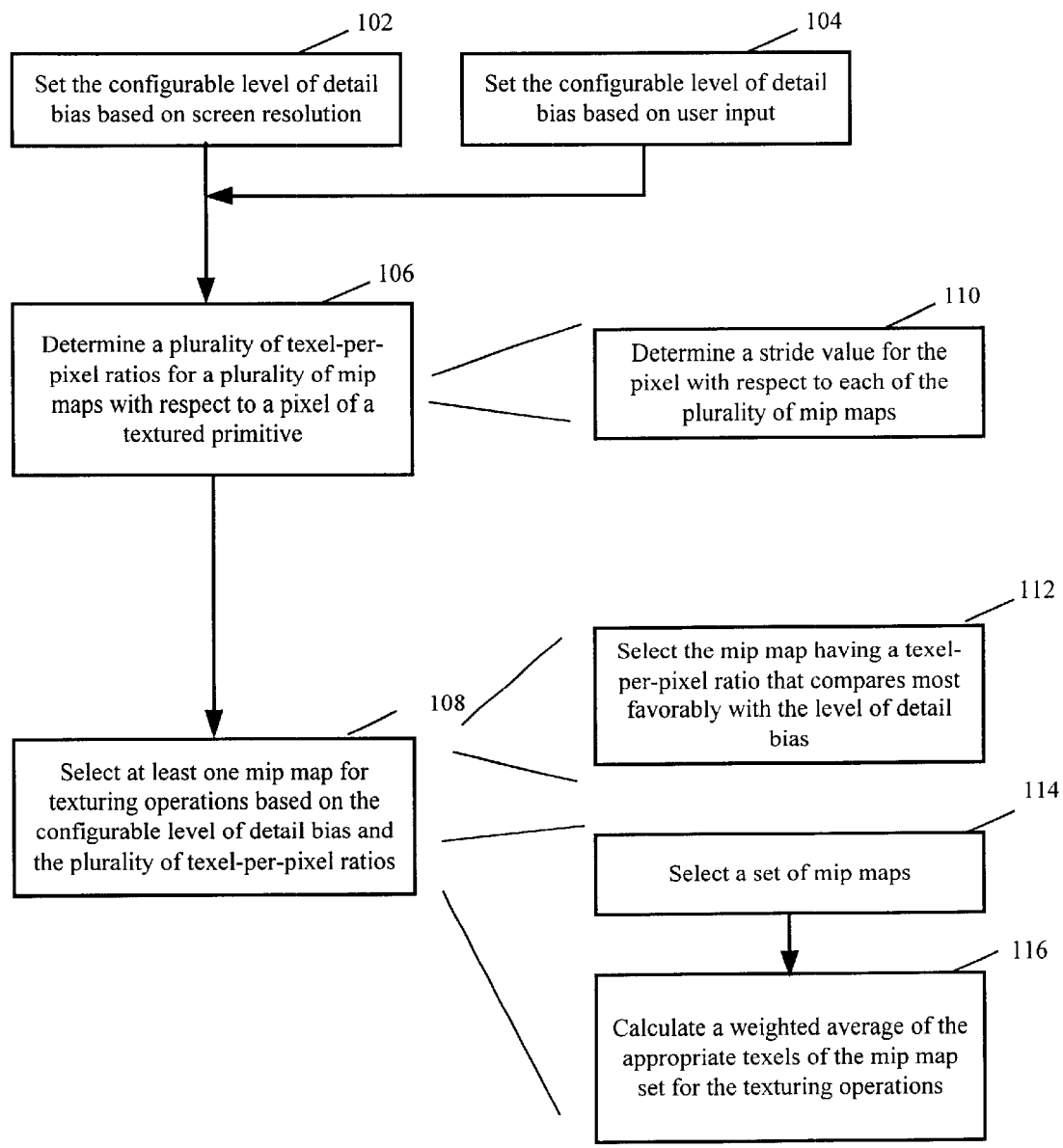
FIG. 4 illustrates a flow diagram of a method for controlling texture mip map transitions in a video graphics system in accordance with the present invention.
Figure 6:
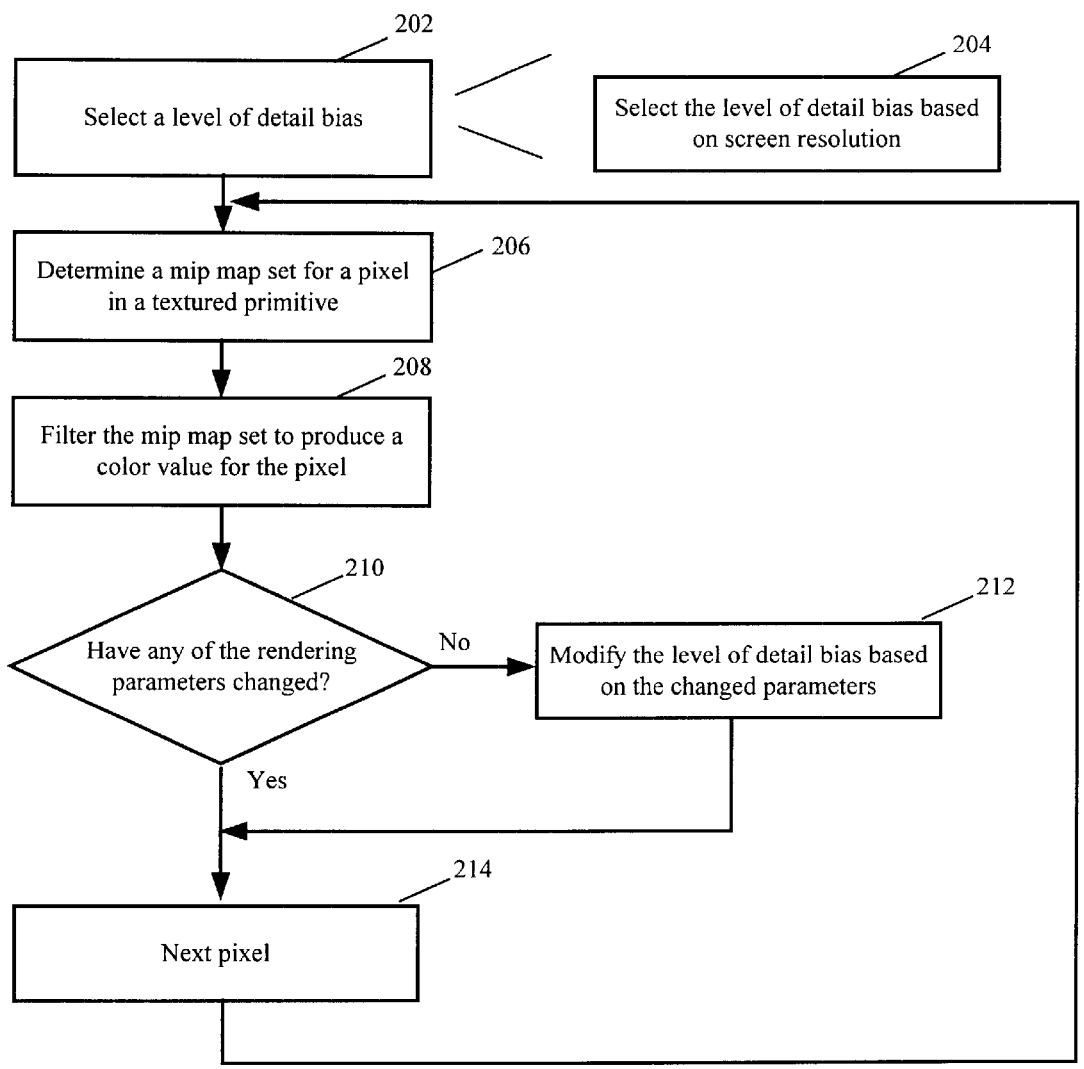
FIG. 6 illustrates a flow diagram of a method for determining a color for a pixel in a video graphics system in accordance with the present invention.

The methods illustrated in FIGS. 4 and 6 provide techniques for controlling texture mip map transitions in video graphics systems to achieve the full level of mip map detail while maintaining improved frame rates over prior art solutions that provided full texture detail. The methods of FIGS. 4 and 6 may be implemented using a processor 90 as illustrated in FIG. 3. The processor 90 includes a processing module 92 and memory 94. The processing module 92 may include a single processing entity or a plurality of processing entities. Such a processing entity may be a microprocessor, microcontroller, digital signal processor, state machine, logic circuitry, and/or any device that processes information based on operational and/or programming instructions. The memory 94 may be a single memory device of a plurality of memory devices. Such a memory device may be a read only memory device, random access memory device, floppy disk, hard drive memory, and/or any device that stores digital information. Note that when the processing module 92 has one or more of its functions performed by a state machine and/or logic circuitry, the memory containing the corresponding operational instructions is embedded within the state machine and/or logic circuitry.

The memory 94 stores programming and/or operational instructions that, when executed, allow the processing module 92 to perform the methods illustrated in FIGS. 4 and 6. Note that the processor 90 may implement some of the functions of FIGS. 4 and 6 through software stored in the memory 94, whereas other portions may be implemented using hardware, or circuitry within the processor 90. Thus, a mix of hardware and software may be used to perform the methods illustrated in FIGS. 4 and 6. It should also be noted that although the methods of FIGS. 4 and 6 may be performed through a mix of hardware and software, this is merely one embodiment of a system that can perform these methods.

FIG. 4 illustrates a method for controlling texture mip map transitions in a video graphics system. The method preferably begins with either step 102 or step 104. At step 102, the configurable level of detail bias corresponding to the system is set based on the screen resolution of the display. Step 104 illustrates another potential embodiment of the invention, where the level of detail bias is set based on input received from a user. For example, a user playing a video game that uses 3D graphics may configure the level of detail bias to achieve the best performance for the particular game while maintaining a user-preferred level of textured detail. Note that a combination of steps 102 and 104 could be used to set the level of detail bias. One example is a user selecting from a set of level of detail bias values chosen based on the screen resolution.

At step 106 a plurality of texel-per-pixel ratios corresponding to a plurality of mip maps are determined. Each texel-per-pixel ratio determines a number of texels for a corresponding one of the plurality of mip maps that map to a pixel in a textured primitive of the display frame. Step 106 may include determining a texel-per-pixel ratio for all of the potential mip maps or for a certain subset of the potential mip maps, where the subset is selected based on screen resolution or some other factor.

Figure 5:
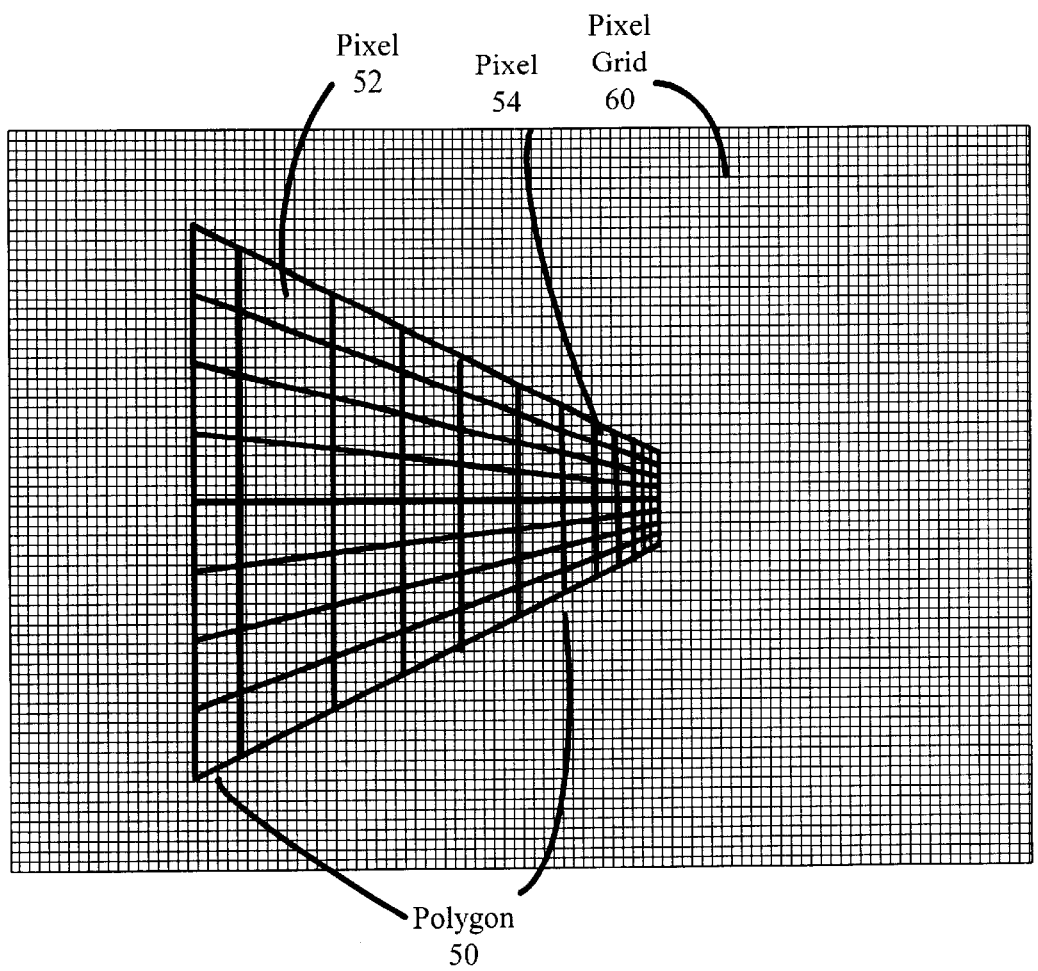
FIG. 5 illustrates an example display that includes pixels whose color values are determined using texture mip maps in accordance with the present invention.

The texel-per-pixel ratio for a particular pixel may be determined by determining a stride value for the pixel with regard to each of the plurality of mip maps. The stride value for a mip map indicates the number of texels within the mip map that will be "stepped across" as a transition from one pixel to the next occurs. In order to determine the texel-per-pixel ratio for a particular mip map, the location of the pixel in the polygon, or primitive must be taken into account along with the orientation of the polygon or primitive with respect to the viewer. This may be better illustrated by referring to FIG. 5. FIG. 5 illustrates a pixel grid 60 upon which a polygon 50 is drawn. Note that the brick-like pattern of the polygon 50 is included merely to illustrate perspective. Assuming that the texture present in the mip maps 12–18 is to be applied to the polygon 50, the stride at two different pixel locations within the polygon 50 with respect to particular mip maps can be determined.

At the pixel location 52, a much larger version of the image contained in the mip maps will be displayed. This is because the texture is being applied to a portion of the polygon that is visually perceived as being closer to the viewer. In order to maintain visual perspective, objects closer to the viewer are typically rendered with more detail. Thus, the stride present at the pixel location 52 will be much smaller in the mip map 22 than the stride at the pixel location 54, which is much more distant from the viewer.

It should be apparent that the stride within a particular mip map for a pixel location corresponds to the texel-per-pixel ratio of that mip map for that particular pixel. In order to determine the stride for a particular pixel within a primitive, stride values contained at vertices of the primitive can be used to determine the stride value at a particular pixel location. Preferably, these vertex stride values are used with an interpolation function to determine a stride value at a particular pixel location within the primitive. Note that there are many additional techniques that can be utilized for determining the stride for a particular pixel with respect to a mip map that should be apparent to one of ordinary skill in the art.

Returning to FIG. 4, at step 108 at least one mip map is selected for texturing operations based on the configurable level of detail bias and the plurality of texel-per-pixel ratios. In one scenario, at step 112, the mip map having a texel-per-pixel ratio that compares most favorably with the level of detail bias is selected. This assumes that no blending operation between various mip maps occurs, or it assumes that a particular mip map is so well suited to a particular pixel location that no blending operation is required. Once the mip map has been selected, it can be utilized for the texturing operations to be performed on the particular pixel.

In another scenario, at step 114, a set of mip maps is selected based on the configurable level of detail bias and the plurality of texel-per-pixel ratios. The set preferably includes at least one selected mip map. At step 116, when the set of mip maps includes a plurality of selected mip maps, a weighted average of selected texels within the plurality of selected mip maps is calculated for use in the texturing operations. The weighted average of the selected pixels within the plurality of selected mip maps is determined based on the configurable level of detail bias and the plurality of texel-per-pixel ratios. Thus, those mip maps that compare more favorably with the level of detail bias will receive a larger weight in the overall determination, whereas those that compare less favorably with the level of detail bias will receive less emphasis.

FIG. 6 illustrates a flow diagram of a method for determining a texture color for a pixel in a video graphics system. The method begins at step 202 where a level of detail bias is selected. At step 204, this selection is shown to be based on screen resolution. As was described with respect to steps 102 and 104 of FIG. 4, the level of detail bias may be selected based on the display resolution, user input, or some combination thereof.

At step 206, a mip map set for a pixel included in a textured primitive of the display frame is determined. The mip map set includes one or more mip maps that have texel-per-pixel ratios that compare favorably with the selected level of detail bias. What constitutes a favorable comparison will be determined by the representation of the level of detail bias. The method of determining the texel-per-pixel ratio for each of the mip maps can be performed as described with respect to FIG. 4. Preferably, the mip map set is determined from a plurality of mip maps that include different sized versions of a particular texture image. An example of this is illustrated in FIG. 1. More preferably, the plurality of mip maps include scaled images of the particular texture image such that scaling of these scaled images is based on a power of two. This implies that successive images included in the scaled image set include one quarter as many texels as previous images.

At step 208, the mip map set is filtered to produce a color value for the pixel. When the mip map set includes a plurality of mip maps, a blending operation combines at least one texel from each of the plurality of mip maps to produce the color value. In another embodiment, two or more mip maps may be chosen even though only texels from one are used in determining the color value. In other words, the weighting of the mip maps may be such that one receives no weight at all. This blending operation may include performing a weighted average of the texels surrounding the point in UV space within each of the mip maps that corresponds to the location of the pixel within the particular graphics primitive. For example, in a bilinear filtering operation, the closest 4 texels in a single mip map are blended to determine the pixel color. In other forms of filtering, various combinations of the surrounding texels, which may include a large number of texels or texels from multiple mip maps, are used to produce a color value. Note that the color value produced through these operations is merely the color value determined from the texturing operations, and this color value may be altered by other video graphics processing prior to the actual generation of the color for the pixel on a display screen.

At step 210, it is determined whether or not one or more of the rendering parameters have changed. The rendering parameters determine the current rendering state. The rendering parameters can include such things as the screen resolution, the size of the window in which the image is being drawn, the texturing parameters, etc. If one of the rendering parameters changes, the method proceeds to step 212 where the level of detail bias is modified to reflect the change. When the screen resolution changes, the modification to the level of detail bias preferably ensures that mip map transitions that occur on the display are maintained at the same distance relative to the viewer's perspective. Once the level of detail bias has been modified at step 212, or in the case where the screen resolution does not change, the method proceeds to step 214 where the next pixel is processed.

By dynamically configuring the level of detail bias based on screen resolution, the trade-off between system performance and texture detail visible to the user can be controlled to ensure detail and performance are not sacrificed unnecessarily. Configuring the level of detail bias in such a manner allows for the maximum potential detail within a texture to be viewed in certain situations, and also improves the overall system performance from prior art solutions that utilized maximum detail mip maps. Including a user interface that allows a user to adjust this level of detail bias ensures that the assumptions made by system developers in terms of user preferences are not limiting in terms of the actual possibilities presented to the user. Thus, a user that prefers maximum texture detail and does not mind compromising display speed can configure the level of detail bias to suit his or her needs. Similarly, users that prefer maximum frame rate to intricate texture detailing can adjust the level of detail bias to suit their needs.

It should be understood that the implementation of other variations and modifications of the invention in its various aspects should be apparent to those of ordinary skill in the art, and that invention is not limited to the specific embodiments described. It is therefore contemplated to cover by the present invention, any and all modifications, variations, or equivalents that fall within the spirit and scope of the basic underlying principals disclosed and claimed herein.

What is claimed is:

1. A method for controlling texture mip map transitions in a video graphics system, comprising:

determining a plurality of texel-per-pixel ratios corresponding to a plurality of mip maps, wherein each texel-per-pixel ratio determines a number of texels for a corresponding one of the plurality of mip maps that map to a pixel in a textured primitive of a display frame; and selecting at least one mip map for texturing operations based on the plurality of texel-per-pixel ratios and a configurable level of detail bias, wherein the configurable level of detail bias determines when transitions between mip maps occur.

2. The method of claim 1, wherein selecting further comprises selecting a set of mip maps based on the configurable level of detail bias and the plurality of texel-per-pixel ratios, wherein the set includes at least one selected mip map, wherein when the set of mip maps includes a plurality of selected mip maps, a weighted average of the plurality of selected mip maps is used in the texturing operations, wherein the weighted average is determined based on the configurable level of detail bias and the plurality of texel-per-pixel ratios.

3. The method of claim 1, wherein determining further comprises determining a stride value for the pixel with regard to each of the plurality of mip maps, wherein the stride value for each mip map indicates the texel-per-pixel ratio for the mip map.

4. The method of claim 3, wherein the stride value for the pixel is determined by interpolating stride values at vertices of a graphics primitive that includes the pixel.

5. The method of claim 1 further comprises setting the configurable level of detail bias based on input received from a user.

6. The method of claim 1, wherein the configurable level of detail bias is determined based on resolution of the display.

7. The method of claim 6, wherein the configurable level of detail bias is selected such that mip map transitions within a graphics primitive drawn to the display are consistent across multiple display resolutions.

8. A processor for controlling mip map transitions in a video graphics system, comprising:

a processing module;

memory operably coupled to the processing module, wherein the memory stores operating instructions that, when executed by the processing module, cause the processing module to perform the functions of:

determining a plurality of texel-per-pixel ratios corresponding to a plurality of mip maps, wherein each texel-per-pixel ratio determines a number of texels for a corresponding one of the plurality of mip maps that map to a pixel in a textured primitive of a display frame; and selecting at least one mip map for texturing operations based on the plurality of texel-per-pixel ratios and a configurable level of detail bias, wherein the configurable level of detail bias determines when transitions between mip maps occur.

9. The processor of claim 8, wherein the memory includes operating instructions such that the processing module performs the step of selecting by selecting a set of mip maps based on the configurable level of detail bias and the plurality of texel-per-pixel ratios, wherein the set includes at least one selected mip map, wherein when the set of mip maps includes a plurality of selected mip maps, a weighted average of the plurality of selected mip maps is determined for use in the texturing operations, wherein the weighted average is determined based on the configurable level of detail bias and the plurality of texel-per-pixel ratios.

10. The processor of claim 8, wherein the memory includes operating instructions such that the processing module performs the step of determining by determining a stride value for the pixel with regard to each of the plurality of mip maps, wherein the stride value for each mip map indicates the texel-per-pixel ratio for the mip map.

11. The processor of claim 10, wherein the memory includes operating instructions such that the processing module determines the stride value for the pixel by interpolating stride values at vertices of a graphics primitive that includes the pixel.

12. The processor of claim 8, wherein the memory includes operating instructions such that the processing module performs the further function of setting the configurable level of detail bias based on input received from a user.

13. The processor of claim 8, wherein the memory includes operating instructions such that the processing module determines the configurable level of detail bias based on resolution of the display.

14. The processor of claim 13, wherein the memory includes operating instructions such that the processing module selects the configurable level of detail bias such that mip map transitions within a graphics primitive drawn to the display are consistent across multiple display resolutions.

15. A method for determining a color for a pixel in a video graphics system, comprising:

selecting a level of detail bias;

determining a mip map set for a pixel included in a textured primitive of a display frame, wherein each mip map included in the mip map set has a texel-per-pixel ratio that compares favorably with the level of detail bias; and filtering the mip map set to produce a color value for the pixel, wherein when the mip map set includes a plurality of mip maps, a blending operation combines at least one texel from each of the plurality of mip maps to produce the color value.

16. The method of claim 15, wherein selecting the level of detail bias further comprises selecting the level of detail bias based on screen resolution.

17. The method of claim 16, further comprises:

detecting when at least one rendering parameter is altered; and when at least one rendering parameter is altered, modifying the level of detail bias.

18. The method of claim 15, wherein the mip map set is determined from a plurality of mip maps that include different sized versions of a particular texture image.

19. The method of claim 18, wherein the plurality of mip maps include scaled images of the particular texture image, wherein scaling of the scaled images is such that successive images include one-fourth as many texels as previous images.

20. The method of claim 19, wherein the plurality of mip maps include square scaled images of the particular texture image, wherein size of the square scaled images is power of two based.

21. A processor for controlling mip map transitions in a video graphics system, comprising:

a processing module;

memory operably coupled to the processing module, wherein the memory stores operating instructions that, when executed by the processing module, cause the processor to perform the functions of:

selecting a level of detail bias;

determining a mip map set for a pixel included in a textured primitive of a display frame, wherein each mip map included in the mip map set has a texel-per-pixel ratio that compares favorably with the level of detail bias; and filtering the mip map set to produce a color value for the pixel, wherein when the mip map set includes a plurality of mip maps, a blending operation combines at least one texel from each of the plurality of mip maps to produce the color value.

22. The processor of claim 21, wherein the memory includes instructions such that the processing module selects the level of detail bias based on screen resolution.

* * * * *